April 7, 1925.
A. L. BAUSMAN
1,532,797
APPARATUS FOR COATING CONFECTIONS
Filed Jan. 12, 1924  2 Sheets-Sheet 1
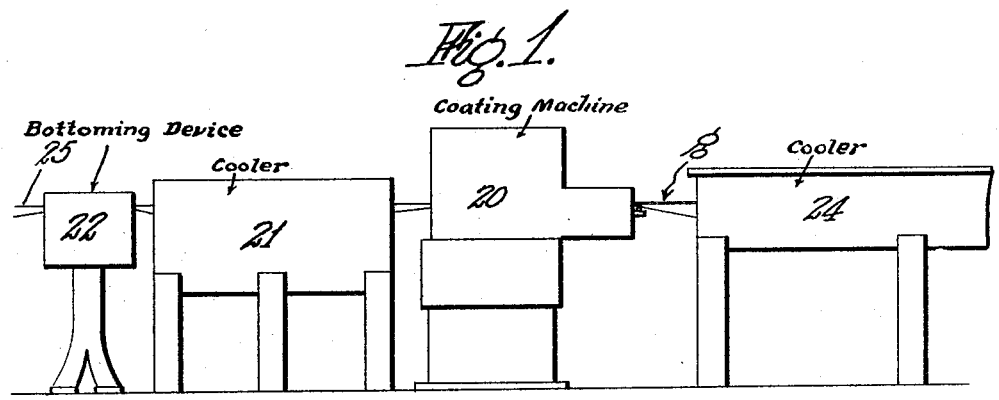
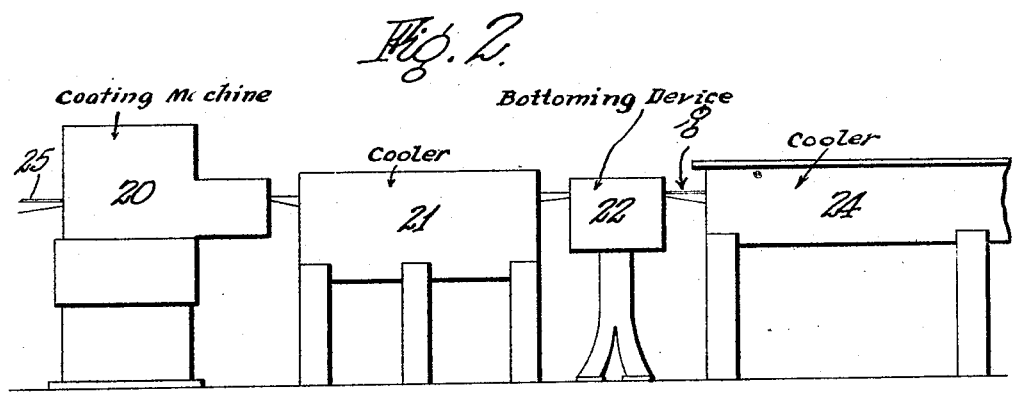
INVENTOR
ATTORNEYS April 7, 1925. 1,532,797
A. L. BAUSMAN
APPARATUS FOR COATING CONFECTIONS
Filed Jan. 12, 1924 2 Sheets-Sheet 2
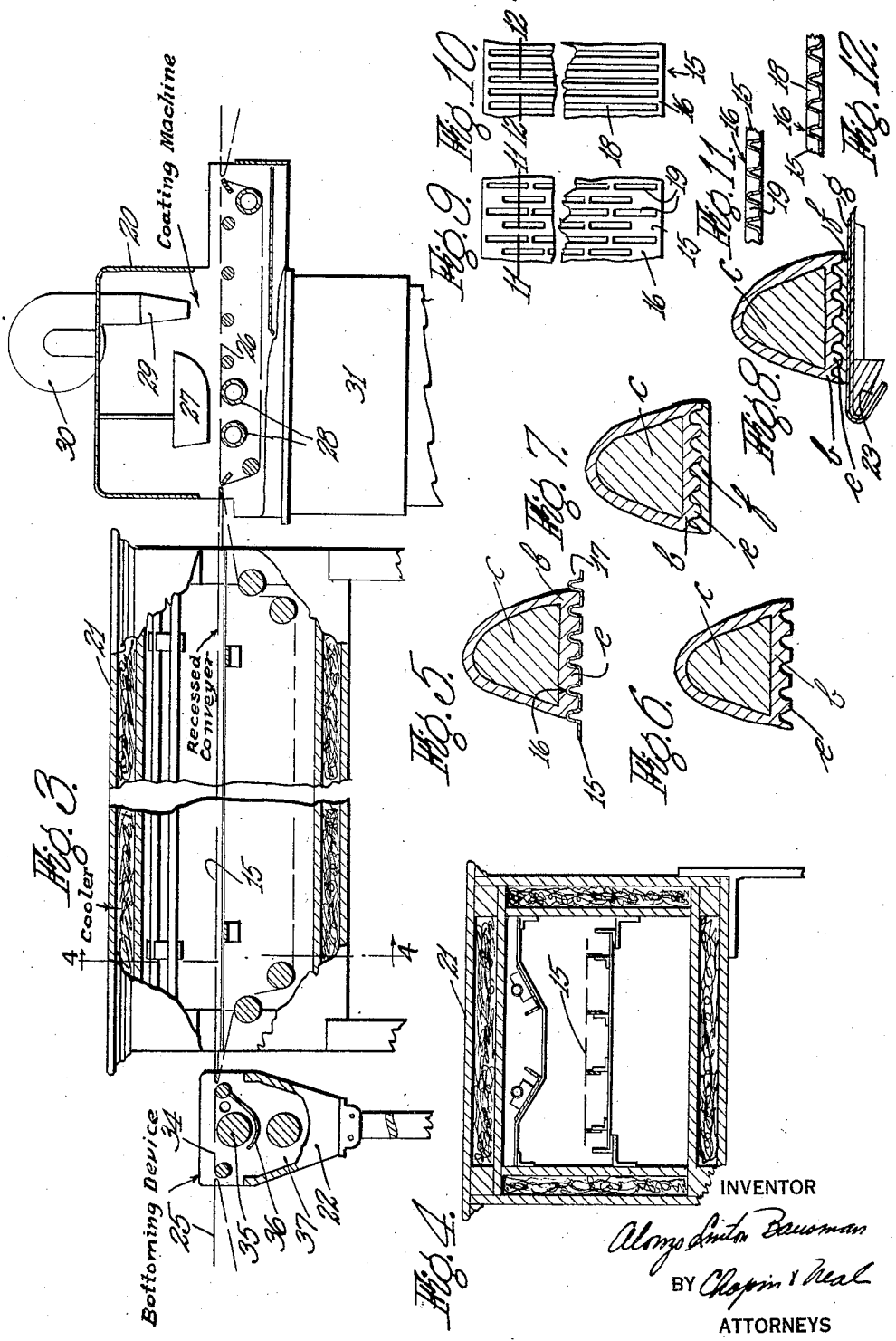
INVENTOR
Alonzo Linton Bausman
BY Chapin & Neal
ATTORNEYS Patented Apr. 7, 1925.

1,532,797

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

APPARATUS FOR COATING CONFECTIONS.

Application filed January 12, 1924. Serial No. 685,343.

*To all whom it may concern:*

Be it known that I, ALONZO LINTON BAUSMAN, a citizen of the United States, residing at Springfield, in the county of Hampden and State of Massachusetts, have invented new and useful Improvements in Apparatus for Coating Confections, of which the following is a specification.

This invention relates to improvements in apparatus for coating confections and is particularly directed to improvements in the bottom coating of confections.

This invention is also a development of that disclosed in my copending application Serial No. 684,795, filed January 7, 1924.

The problem of providing a satisfactory bottom coating on confections, coated by machines of the fountain feed type, is one which presents many difficulties. The bottom coating is apt to be thinner than the coatings on the top and side walls of the confections due to the squeezing out of some of the coating, while still in a plastic state, by the weight of the confections. The confections are usually transferred, before the coating has set, to a delivery belt having a smooth surface which is impervious to the coating material, usually chocolate. Consequently, since the confections are supported on this belt by their bottom coatings, the weight of the confections causes the bottom coatings to be compacted and pressed out to some extent. To overcome this difficulty, a bottom coating has been applied to the confections, prior to their entrance into the coating machine, and this first bottom coating has been chilled so as to function as a support during the operation of completely coating the confections, which operation includes the application of a second bottom coating. This practice is not, however, a complete solution of the problem for the confections are carried from the first bottom coating device to the coating machine by a smooth impervious belt and, although this belt travels over a cooling table, some of the plastic bottom coating is squeezed out in the same manner as above described, before it can be chilled. The difficulty is in getting enough chocolate to stay on the bottom of the confection to form an adequate support during the main coating operation. In general, enough chocolate can be applied to the bottom of the confection but it is difficult to keep it there on account of the "squeezing out" action and, if only a thin bottom coating is left when the confection enters the coating machine, much of the beneficial effect is then lost by the softening action which takes place by the application of warm chocolate in the coating machine.

This invention has for its general object the provision of a means for retaining on the confections an adequate and substantial amount of the first application of bottom coating to support the weight of the confections during the second bottom coating operation and substantially lessen the disadvantageous effects, heretofore encountered, from the squeezing out of the bottom coating.

In carrying out the invention, use is made of a recessed confection support on which the confections are supported, or carried, after the application of the first bottom coating and until the coating has hardened and the hardening operation may be accelerated by artificial cooling means. By the use of such a support, as distinguished from the smooth impervious support heretofore used in the same general location and for the same primary purpose, an adequate amount of the first bottom coating may be retained on the confections. As the weight of a confection presses down on the bottom coating, parts thereof are received in the recesses and prevented from squeezing out sidewise. The portions of the support between the recesses limit the degree to which the confection can sink in the bottom coating and even in the event that such portions completely penetrate the bottom coating and actually abut the bottom of the confection, there will be a substantial amount of material in the recesses. By cooling the coating while the confection is on the recessed support, the portions of the coating in the recesses are retained, thereby forming legs or feet on the bottom of the coating, which are later utilized to limit the degree to which the confection can sink in the subsequently applied final bottom coating.

The invention may be practiced by applying the first bottom coating in the usual bottom coating device outside the coating machine and applying the final bottom coating in said machine at the same time that the tops and sides of the confections are coated. This arrangement possesses a certain advantage in that the color and appearance of the product will tend to be uniform without special care being taken to insure it. However, the confections may first be completely coated in the usual coating machine and the second bottom coating subsequently applied. Naturally, more care will be necessary with this latter arrangement in order to secure uniformity of color and appearance between the bottom and the remaining coatings than with the arrangement first described but, on the other hand, there is less tendency to soften the legs formed in the first bottom coating during the application of the second bottom coating because the confections remain in the bottoming device for considerably less time than in the coating machine.

In connection with the invention, it is desirable to accelerate the hardening of the first bottom coating by some special cooling means, although it is within the province of the invention to allow the coating to harden in the natural manner without special provisions for this purpose.

The invention will more particularly appear from the following description and the illustrative embodiment of the invention in the accompanying drawings, in which:—

Fig. 1 is a small scale elevational view, largely in conventional form, showing one arrangement of the different units of the apparatus;

Fig. 2 is a similar view showing another arrangement of these units;

Fig. 3 is a somewhat enlarged sectional elevational view showing in detail the more essential parts of the apparatus shown in Fig. 1;

Fig. 4 is a cross sectional view taken on the line 4—4 of Fig. 3;

Figs. 5, 6, 7 and 8 are large scale detail views showing various steps in the operation of bottom coating a confection.

Figs. 9 and 10 are fragmentary plan views illustrative of the recessed confection support; and Figs. 11 and 12 are cross sectional views taken on the lines 11—11 and 12—12 of Figs. 9 and 10, respectively.

Referring to these drawings and particularly to Figs. 5, 6, 7, and 8, the confection, such as $c$, has applied thereto in any suitable manner a bottom coating $b$ of the desired material, usually chocolate. The confection is then placed on a support 15, the confection supporting face 16 of which is suitably recessed, as at 17. The confection is supported from face 16 by means of its bottom coating and the weight of the confection will, as formerly, cause some of the bottom coating to be squeezed out, but the squeezing out action will occur only at intervals and is not effective over the entire bottom area of the confection, as heretofore. Obviously, the recesses 17 will fill with coating material and, while the confection may sink toward face 16, the material in the recesses cannot be squeezed out even should the confection $c$ come directly into contact with face 16. The recesses will therefore be filled with portions of coating material depending from the bottom coating and, by cooling the coating while the confection is on support 15, these depending portions are retained as legs or feet $e$ to support the confection during the second bottom coating operation. The cooling may be effected naturally or artificially as desired. A second bottom coating $f$ is then applied, as indicated at $f$ in Fig. 7, and while the ridges $e$ may soften somewhat during the application of the coating $f$, their height is such that substantial legs will remain after such application. The confection is then placed on a support $g$, having a smooth surface and one which is impervious to the coating material. The surface of support $g$ may consist of waxed paper, oil cloth or the like. The weight of the confection presses the bottom coating against the smooth surface $g$ and smooths out the bottom coating, giving it a nice glazy surface. While the confection, due to its weight, also sinks into the coating $f$ and squeezes out some of it, nevertheless all of the coating $f$ is not squeezed out and at least as much remains as in former methods and this much, plus the height of the legs $e$, gives a considerably heavier coating than can be effected by the methods ordinarily used heretofore. The legs $e$ effectively limit the degree to which the confection can settle into the final bottom coating and the invention is characterized by retaining a great deal more of the first bottom coating by this arrangement, which permits the formation of such legs, than can be retained by former methods.

By the term recessed is meant all forms of pockets, depressions, grooves, corrugations, and the like and, in fact, any construction which will afford separated confection supporting portions in the plane of face 16 and intervening areas into which portions of the coating may depend to form legs, such as $e$. The recesses are preferably narrow and closely spaced with respect to the bottom area of confection $c$, in order that a plurality of legs $e$ may be formed on each. The recesses may be continuous across the support 15, as indicated by grooves 18 in Figs. 10 and 12, or non-continuous, as indicated in Figs. 9 and 11, by the pockets 19 which are arranged in rows with the pockets of one row staggered with respect to those in adjacent rows. Countless variations in the shape, area and arrangement of the recesses will occur to those skilled in the art and I intend to cover by the term "recessed support" any support which will admit the molding on the bases of a confection of ridges, feet or their equivalent.

The invention has been described as it might be practiced by hand. It may equally well and preferably is, carried out automatically and an exemplary apparatus for this purpose will now be described. This apparatus, in its broader aspects consists, of two separated bottom coating devices and a recessed support disposed therebetween, such support preferably being a movable one, in the nature of an endless belt, in order to carry the confections from one coating device to the other. Thus, in Fig. 2, a coating machine 20, of well known form, is employed for applying the first bottom coating as well as the top and side coatings, which are usually desired. The confections are then cooled, preferably although not necessarily by artificial means, such as the cold box 21, after which the final bottom coating is applied by a so-called bottoming device 22, also of well known form. The confections are then transferred to the smooth impervious support $g$, which may also be in the nature of a belt, usually driven by an underlying belt, such as 23 (Fig. 8). While the confections may be finally cooled in any suitable manner, they are herein shown as being cooled by a cold box 24, through which they are carried by the belt $g$. As above described, the first bottom coating may be applied by the usual bottom device 22, then chilled, as by the cold box 21 or otherwise, and the second bottom coating as well as the top and side coatings may be applied in the coating machine 20, all as indicated in Fig. 1.

Referring now to the details of the apparatus shown in Fig. 3, the coating machine 20 and the bottom device 22, illustrated herein, are of the general type shown in my prior U. S. Letters Patent No. 1,323,948 granted December 2, 1919. Other types may equally well be used, however, and those shown herein are given as illustrative examples of types which have been found suitable for the purpose. The coating machine includes a confection feed belt 25, a pervious coating belt 26, usually of wire mesh, a shower pan 27 for delivering a downward flow of coating material upon the tops and sides of the confections as they travel thereinunder on belt 26, bottom coating rolls 28 which pick up some of the coating passing through belt 26 and apply the same to the bottoms of the confections while on belt 26. The confections, after passing the shower pan 27, travel on belt 26 long enough to allow superfluous coating to drain therefrom and usually are subjected to a blast of air from a nozzle 29, supplied from a fan 30 for the purpose of removing excess coating. Chocolate, or other coating, is supplied to shower pan 27 from a supply tank 31 by suitable means not shown. A more complete disclosure of the coating machine may be had by reference to the above identified patent.

The bottoming device 22 includes a wire mesh conveyer 34 having its upper lap of travel in line with, and in the same plane as, conveyer 26. Underlying this conveyer, intermediate its ends, is a bottoming roll 35 and underlying the latter is a pan 36 which is kept supplied with chocolate. The roll 35 picks up some of the coating and applies it to the bottoms of the confections while travelling on the upper stretch of conveyer 34. Excess coating drains back into a tank 37. To secure uniformity in color and appearance between the coating applied in device 22 and that applied in machine 20, the coating for the former is preferably supplied from the latter as disclosed in the patent, above identified.

The operation of the apparatus will sufficiently appear from the foregoing description.

It will be apparent from the foregoing description that the invention is characterized by retaining enough of the first bottom coating to serve its intended purpose during the second bottom coating operation. While the means, heretofore used, will apply sufficient amounts of bottom coating, the difficulty has been in retaining a sufficient amount of the applied bottom coating and this invention overcomes this difficulty by the use of a recessed support or conveying means for supporting the confections until the first bottom coating has hardened. As shown, the supporting and conveying means between both bottom coating means is entirely of a recessed nature but this is not necessarily essential for the desired function of the type of conveying and supporting means is accomplished as soon as the legs $e$ have been hardened.

I believe myself to be the first to bottom coat confections by the method and with the apparatus herein described and I desire to claim my invention in the broadest possible legal manner.

What I claim is:

1. In combination, means for applying a bottom coating to confections, recessed supporting means for the coated confections on which means the bottom coatings rest until they are hardened, and means for subsequently applying a second bottom coating to the confections.

2. In combination, means for applying a bottom coating to confections, recessed conveying means for carrying the confections during the application of said coating and for a sufficient time thereafter to allow said coatings to harden, and means for subsequently applying a second bottom coating to the confections.

3. In combination, means for applying a bottom coating to confections, recessed supporting means for the coated confections on which means the bottom coatings rest until they are hardened, and means for subsequently completely coating the confections including the application of a second bottom coating.

4. In combination, a bottom coating device, a confection coating machine, and recessed conveying means to carry the confections from said device to said machine and on which means the bottom coatings are hardened prior to the entrance of the confections into said machine.

5. In combination, a bottom coating device, a confection coating machine, recessed conveying means to carry the confections from said device to said machine, and means to chill the bottom coatings while on said means and prior to the entrance of the confections into said machine.

6. In combination, means for applying a bottom coating to confections, recessed supporting means for the coated confections on which means the bottom coatings rest, means for cooling said bottom coatings, and means for subsequently applying a second bottom coating to the confections.

7. In combination, means for applying a bottom coating to confections, recessed supporting means for the coated confections on which means the bottom coatings rest until they are hardened, means for subsequently applying a second bottom coating to the confections, and conveying means having a smooth impervious surface for carrying the confections through said apparatus.

8. In combination, means for applying a bottom coating to confections, recessed supporting means for the coated confections on which means the bottom coatings rest until they are hardened, means for subsequently completely coating the confections including the application of a second bottom coating, apparatus for effecting a final cooling of the confections, and conveying means having a smooth impervious surface for carrying the confections through said apparatus.

In testimony whereof I have affixed my signature.

ALONZO LINTON BAUSMAN.